No. 797,125. PATENTED AUG. 15, 1905.
J. KOENIG.
BILL FILE.
APPLICATION FILED DEC. 14, 1903.
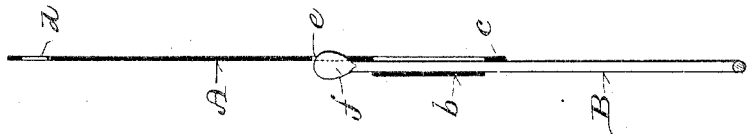
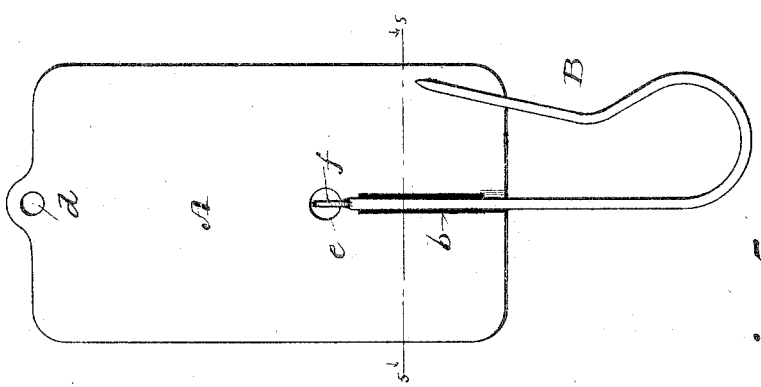
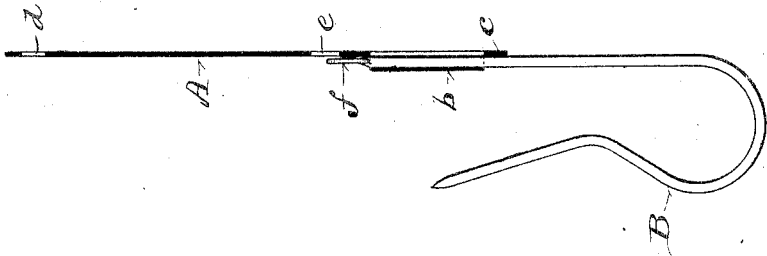
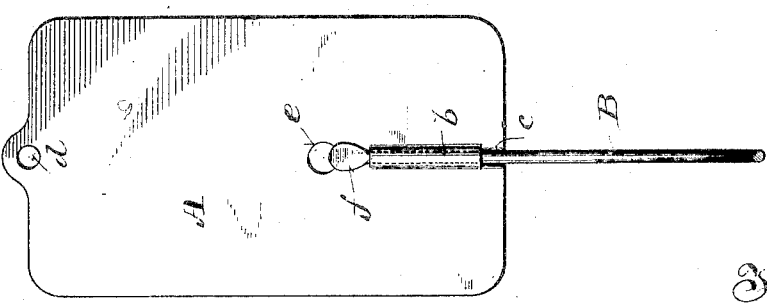
Witnesses
Geo. W. Young.
N. E. Oliphant
Inventor
Joseph Koenig
By H. G. Underwood
Attorneys

UNITED STATES PATENT OFFICE.

JOSEPH KOENIG, OF TWO RIVERS, WISCONSIN, ASSIGNOR TO ALUMINUM MANUFACTURING COMPANY, OF TWO RIVERS, WISCONSIN.

BILL-FILE.

No. 797,125.   Specification of Letters Patent.   Patented Aug. 15, 1905.

Application filed December 14, 1903. Serial No. 185,039.

*To all whom it may concern:*

Be it known that I, JOSEPH KOENIG, a citizen of the United States, and a resident of Two Rivers, in the county of Manitowoc and State of Wisconsin, have invented certain new and useful Improvements in Bill-Files; and I do hereby declare that the following is a full, clear, and exact description thereof.

My invention has for its object to provide simple economical bill-files; and it consists in what is hereinafter particularly set forth with reference to the accompanying drawings and subsequently claimed.

Figure 1 of the drawings represents a partly-sectional front elevation of a bill-file in accordance with my invention; Fig. 2, a partly-sectional view of the same central and longitudinally thereof; Fig. 3, a front elevation of the device, partly in section, and having the plate and hook portions of the same parallel one against the other; Fig. 4, a central longitudinal sectional view of what is shown in the third figure, and Fig. 5 a horizontal section indicated by line 5 5 in said third figure.

Referring by letter to the drawings, A indicates a stiff-metal plate, preferably aluminium, having lower central vertical guides $b$ $c$ pressed out from its front and back. The plate is provided with an upper central opening $d$ for the engagement of a hanger, and another central opening $e$ is provided in said plate adjacent to the upper end of the front guide $b$, as is herein shown.

The shank of a suitably bent and pointed hook B, of wire, is adjustable in the guides $b$ $c$, with which the plate aforesaid is provided, and said shank is flattened to form a stop-head $f$ above the upper one of said guides. The hook being full down, the stop-head end of its shank is parallel to the plate A and said hook held in position at a right angle to said plate for the reception of bills or other papers, said stop-head being in whole or part below the opening $e$ in said plate. If the hook be pushed up a short distance, the stop-head $f$ of its shank will have clearance in the opening $e$ in the stiff-metal plate A, and said hook can be turned parallel to said plate to rest snug against the same.

A recess may be substituted for the opening $e$ in the plate A.

Advertising matter may be displayed on the plate, and the hook being pivotally adjustable to rest snug against said plate the device as a whole can be put into an ordinary envelop for mailing.

Having thus described my invention, what I claim as new, and desire to secure by Letters Patent, is—

A bill-file consisting of a stiff-metal plate having lower central front and rear guides pressed out therefrom and provided with an opening or recess adjacent to the upper end of the upper guide, and a hook the shank of which engages the guides aforesaid and is fashioned above the upper one of same to form a stop-head engageable with said opening or recess in the plate when said hook is turned parallel to the plate.

In testimony that I claim the foregoing I have hereunto set my hand, at Two Rivers, in the county of Manitowoc and State of Wisconsin, in the presence of two witnesses.

JOSEPH KOENIG.

Witnesses:
  W. J. WRIETH,
  G. A. MAGEE.